INVENTOR
JAMES R. TURNER
BY Edwin D. Grant
ATTORNEY

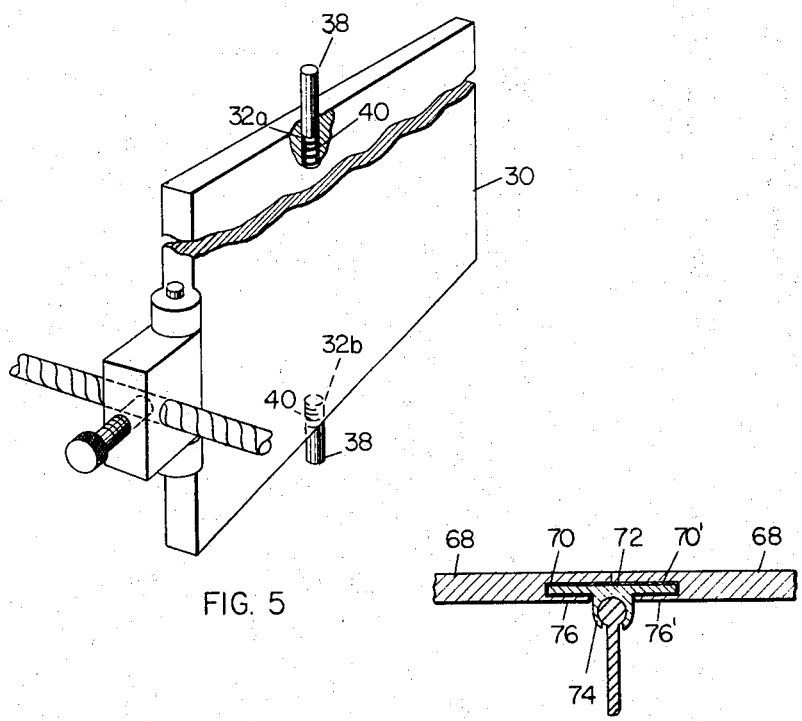
FIG. 5
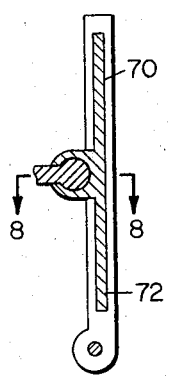
FIG. 7
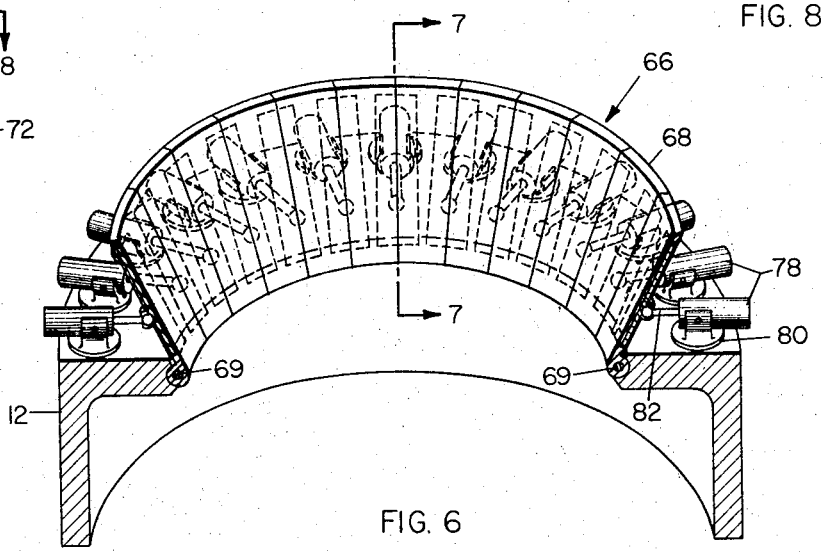
FIG. 8
FIG. 6
INVENTOR.
JAMES R. TURNER
BY Edwin D. Grant
ATTORNEY

3,441,219
DIRECTIONAL CONTROL APPARATUS FOR ROCKET MOTORS

James R. Turner, Ogden, Utah, assignor to Thiokol Chemical Corporation, Bristol, Pa., a corporation of Delaware
Filed Nov. 29, 1966, Ser. No. 597,697
Int. Cl. F02k 1/22
U.S. Cl. 239—265.29      4 Claims This invention relates to steering apparatus for rocket motors and more particularly to directional control means for rocket motors having thrust nozzles that are fixedly positioned on the casings thereof.

One of the problems associated with the use of large solid propellant rocket motors for long range missiles or as boosters for space vehicles is that of directional control. Since the thrust nozzle of a solid propellant motor employed for such purpose is quite large, heavy actuating and mounting mechanisms are required if directional control is to be obtained by pivoting the thrust nozzle relative to the casing of the rocket motor to thereby vary its thrust vector. In addition, the exhaust gases of some solid propellant rocket motors contain solid particles that can cause a movable thrust nozzle to bind as a result of deposition of said particles on surfaces in sliding contact with one another. Consequently, it has been proposed heretofore to control the direction of a solid propellant rocket motor by means of the so-called "secondary injection" guidance system, in which a fluid is injected into the exhaust gases flowing through the thrust nozzle of the rocket motor to thereby exert lateral forces against said thrust nozzle. However, the fluid required for secondary injection guidance control adds weight to a rocket motor that is not usable insofar as thrust is concerned.

The invention disclosed herein provides a means for accomplishing directional control of solid propellant rocket motors without requiring jointed thrust nozzles or heavy actuating mechanisms for such thrust nozzles, and without adding excessive weight that is unusable in producing thrust. Briefly described, a preferred embodiment of the invention comprises a tubular housing joined to the aft end of a solid propellant rocket motor casing and surrounding a thrust nozzle fixedly mounted on said casing, the housing being substantially coterminous with the aft end of said thrust nozzle and spaced therefrom. Four rectangular openings are spaced evenly about this housing equidistant from the aft end thereof, and a closure means is mounted in each of these openings so that they can be covered or uncovered at any selected time. The preferred embodiment also comprises a plurality of interlocked vanes that are pivotally mounted on the aft end of said housing and thus adapted to vary the diameter of said aft end thereof (considering the vanes as part of the housing).

It is accordingly an object of this invention to provide directional control apparatus for a rocket motor having a fixed thrust nozzle.

Another object of this invention is to provide means for controlling the flight path of a rocket motor having a fixed thrust nozzle, which means eliminates the weight disadvantages associated with secondary injection guidance control systems.

Still another object of this invention is to provide rocket motor directional control apparatus that is uncomplicated in design and therefore economical to construct and reliable in operation.

Other objects and advantages of the present invention will become evident in the following description of a preferred embodiment thereof, in which reference is made to the accompanying drawings wherein:

FIGURES 4 and 5 are detail views of a typical one of the louvers of the closure means illustrated in FIGURE 3;

FIGURE 6 is a partially sectional, detail view of the rocket motor of FIGURE 1, illustrating vanes employed for varying the diameter of the aft end of said rocket motor;

FIGURES 7 and 8 are detail views of vanes illustrated in FIGURE 6, taken along the planes represented by line 7—7 of FIGURE 6 and line 8—8 of FIGURE 7 respectively.

Throughout the specification and drawings the same reference numbers refer to the same parts.

Figure 1:
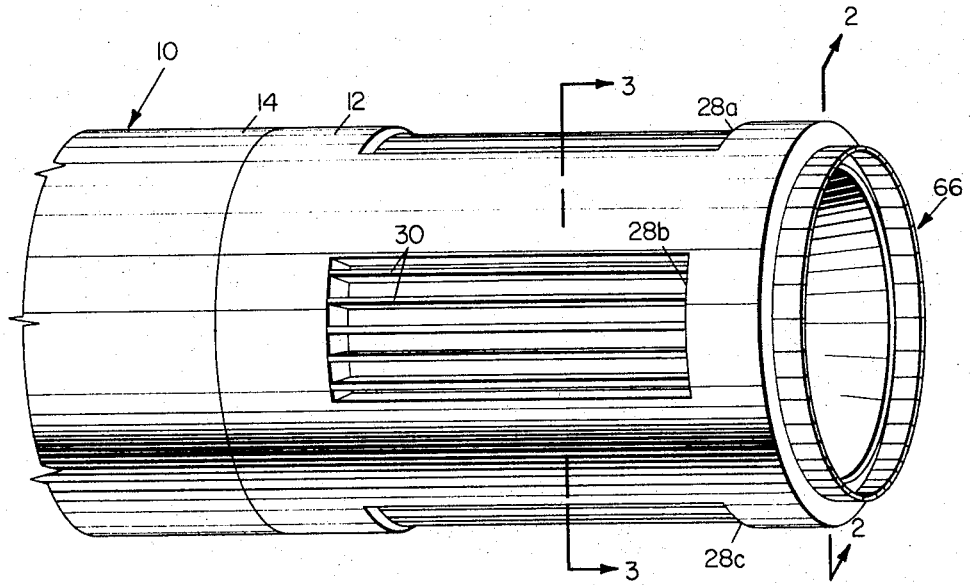
FIGURE 1 is a pictorial view of the aft end of a rocket motor utilizing the preferred embodiment of the invention.
Figure 2:
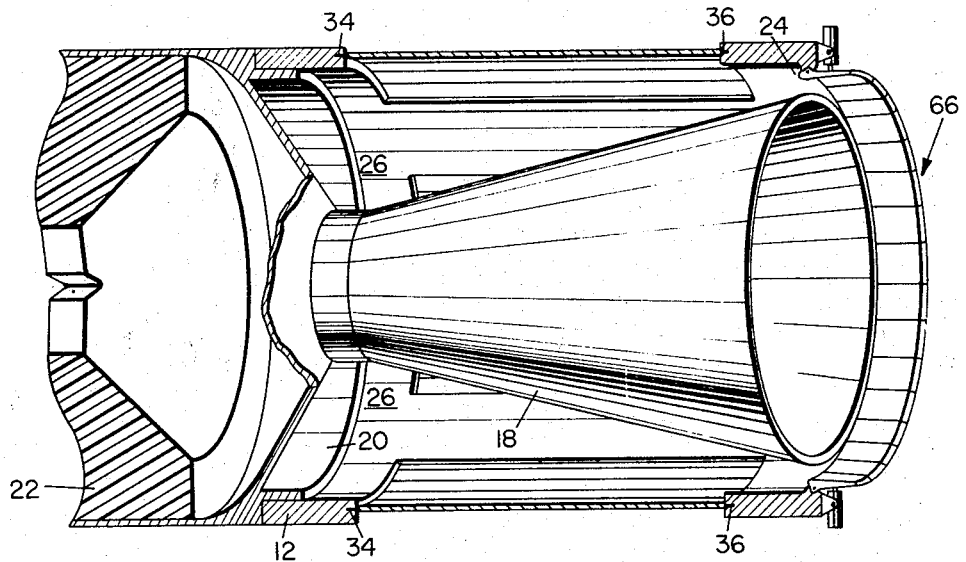
FIGURE 2 is a longitudinal sectional view of the rocket motor of FIGURE 1, taken along the plane represented by line 2—2 in that drawing.

In FIGURE 1 reference number 10 generally designates a rocket motor having a tubular housing 12 the forward end of which is fixedly and sealably joined to the aft end of the casing 14 thereof. More particularly, as illustrated in FIGURE 2, casing 14 of the rocket motor is provided with an integral aft end closure 16, on which is fixedly mounted a thrust nozzle 18, and with an integral, rearward projecting, circumferentially extending flange 20 abuttingly disposed within the forward end of housing 12 and fixedly connected thereto by suitable means such as bolts (not shown). Positioned within casing 14 is a solid propellant charge 22. It can be seen in FIGURE 2 that the aft end of housing 12 is substantially coterminous with the aft end of thrust nozzle 18, although preferably housing 12 extends a short distance beyond the end of said thrust nozzle as illustrated. Housing 12 is concentrically positioned around thrust nozzle 18 so that there is a narrow annular gap 24 between the aft ends of said housing and thrust nozzle and an annular space 26 within said housing.

Four rectangular openings 28a through 28d (three of which are illustrated in FIGURE 1) are formed in housing 12, these openings being evenly spaced apart circumferentially of said housing and equidistant from the aft end thereof. Each opening 28a through 28d is provided with a closure means comprising a plurality of louvers 30 spaced across said opening and pivotally connected at the ends thereof to housing 12. More particularly, as illustrated in FIGURE 5, each louver 30 is formed with two coaxial holes 32a, 32b (one of which is illustrated by broken lines in the drawing) that respectively extend longitudinally of the louver from the end surfaces thereof. As illustrated in FIGURE 2, a plurality of coaxial holes 34, 36 are spaced across the forward and aft walls respectively of each opening 28a through 28d (i.e., the circumferentially extending surfaces of housing 12 that define the forward and aft edges of said openings) and extend longitudinally therefrom. As illustrated in FIGURE 5 (a portion of one end of the louver 30 illustrated in the latter drawing being removed for clarity), a pivot pin 38 is positioned within each of the holes 32a, 32b in the ends of the louvers 30, this pivot pin being biased away from the bottom of said hole by means of a spring 40.

Figure 3:
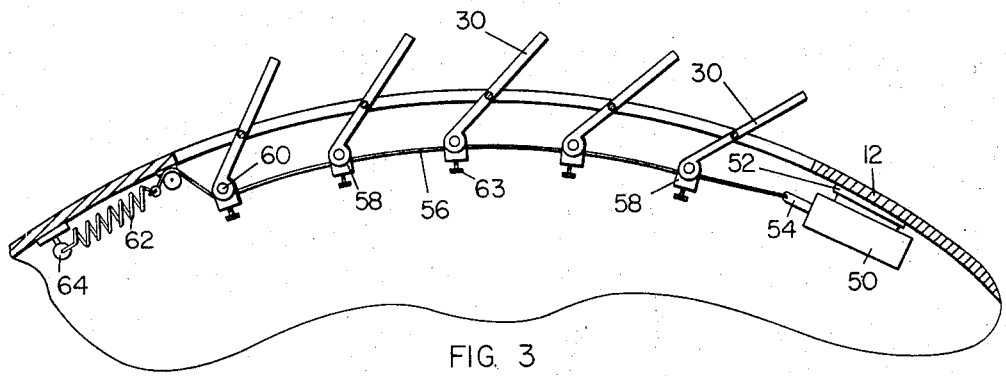
FIGURE 3 is a cross-sectional view of the rocket motor of FIGURE 1, taken along the plane represented by line 3—3 in FIGURE 1 and illustrating closure means of the preferred embodiment utilized therewith in an open position.
Figure 4:
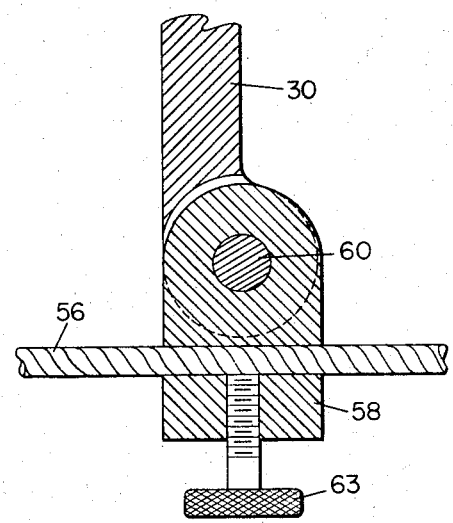

Thus pivot pins 38 can be depressed into holes 32a, 32b of a louver 30, the louver positioned within one of the openings 28a through 28d so that said pivot pins are respectively aligned with two of the coaxial holes 34, 36 formed in the forward and aft walls of said opening, and the pivot pins then seated within said holes 34, 36 respectively under the force exerted thereon by springs 40. Pivot pins 38 slidably fit within holes 32a, 32b and holes 34, 36, and the louvers 30 positioned across each of the openings 28a through 28d can be pivoted between a first position wherein the louvers are substantially flush with the wall of housing 12 (and the openings 28a through 28d are covered as illustrated in FIGURE 2) and a second position wherein the louvers are disposed substantially perpendicular to the wall of said housing (and the openings 28a through 28d are uncovered as illustrated in FIGURE 1). This movement of louvers 30 can be effected at any selected time by control means comprising four hydraulic cylinders 50 (a typical one of which is illustrated in FIGURE 3) each of which is mounted on the inner surface of housing 12 adjacent one of the openings 24a through 24d by means of a support member 52. More particularly, as illustrated in FIGURE 3, the drive shaft 54 of each cylinder 50 is connected to a set of the louvers 30 by means of a cable 56 and a plurality of clamps 58 that are respectively pivotally mounted on louvers 30 by means of pivot pins 60. Each clamp 58 is fixedly positioned on cable 56 by means of a set screw 63, and each cable 56 is connected to a spring 62 which is itself connected at one end to housing 12 by means of a lug 64 and which serves to maintain the louvers 30 in a closed position until the cylinder 50 connected thereto is actuated.

The preferred embodiment of the invention includes flow control means, generally designated in FIGURES 1, 2 and 6 by reference number 66, comprising a plurality of vanes 68 disposed circumferentially of the aft end of housing 12 and each pivotally mounted thereto by a pivot pin 69. As illustrated in FIGURES 7 and 8, each vane 68 has a groove 70 formed in each longitudinally extending edge surface thereof, the vanes being interlocked by a plurality of splines 72 each of which is positioned within the mutually opposed grooves 70, 70' of an adjacent pair of said vanes. Each spline 72 is provided with an integral lug 74 which projects through openings in the adjacent wall portions 76, 76' of vanes 68 and which is formed with a socket. Each of a plurality of hydraulic cylinders 78 is pivotally mounted on the aft end surface of housing 12 by means of a support 80 and is radially aligned with a respective one of the vanes 68. The outer end of the drive shaft 82 of each of said hydraulic cylinders is ball-shaped and engaged within the socket of a respective one of the lugs 74 on vanes 68. Thus drive shafts 82 can be simultaneously retracted into cylinders 78 to pivot vanes 68 from the position thereof that is illustrated in FIGURE 6 to a second position wherein the aft ends of the vanes are displaced outwardly (and the diameter of the aft end of flow control means 66 is increased).

It will be recognized by persons who are skilled in the art of rocket motors that many different materials can be used in fabricating the components of the above-described preferred embodiment of the invention. Preferably, however, vanes 68 and splines 72 are made of heat-resistant metals capable of withstanding the high-temperature exhaust gases discharged from thrust nozzle 18 when rocket motor 10 is operated.

The flow of exhaust gases from thrust nozzle 18 when rocket motor 10 is fired evacuates air from the annular space 26 between said thrust nozzle and housing 12. Experiments have shown that by proper control of the width of gap 24 between the aft ends of thrust nozzle 18 and housing 12, which can readily be accomplished by means of the flow control means 66, it is possible to reduce the pressure within space 26 to approximately 1 p.s.i. After rocket motor 10 is fired, its flight direction can be controlled by actuating a selected one or more of the cylinders 50 to thereby pivot the louvers 30 connected thereto to the position illustrated in FIGURE 1 wherein the opening or openings 28a through 28d in which said louvers are positioned is uncovered. Atmospheric air will then enter the uncovered opening or openings at a high velocity, which alters the pressure balance on housing 12 and pivots rocket motor 10 about its center of gravity, thereby changing the direction of its line of thrust and flight path. It will be understood that the operation of the illustrated directional control apparatus will be effective only at altitudes at which the pressure differential between the atmosphere and the space 26 within housing 12 is sufficient to provide sufficient lateral forces upon said housing to effect movement thereof when one of the openings 28a through 28d is uncovered. However, in many flight programs of large rocket motors the greater part of the directional control of said rocket motors occurs before they reach altitudes at which atmospheric pressure will be too low to provide the required pressure differential referred to above. If necessary, a small amount of secondary injection fluid can be carried by rocket motor 10 to effect minor adjustments of its flight path after major directional control has been accomplished by means of the preferred embodiment of the invention herein disclosed.

Since the operation of the above-described embodiment of this invention does not deflect the main jet stream to gain side thrust for control it allows more efficient fuel consumption. It requires no weight penalty imposed by heavy jointed nozzles or by the noncontributing fluids necessary for secondary injection guidance control. Its effect is independent of velocity and therefore is as effective at lift-off as at any other period during boost phase of a rocket.

It will also be recognized that many modifications can be made in the directional control apparatus that has been described and illustrated herein for the purpose of example, without, however, departing from the spirit and scope of the invention as set out in the appended claims.

What is claimed is:

1. In a rocket motor having a thrust nozzle fixedly mounted on the casing thereof, directional control means for pivoting said rocket motor about the longitudinal axis thereof for controlling the direction of thrust of said motor comprising, a tubular housing one end of which is fixedly and sealably joined to the aft end of said casing and the other end of which is substantially coterminous with the aft end of said thrust nozzle, said housing having at least one peripheral, longitudinally extending opening formed therein and being concentrically positioned around said thrust nozzle to provide an annular gap between the aft ends of said housing and thrust nozzle;
   closure means mounted on said housing and adapted for movement between a first position wherein said opening is covered thereby and a second position wherein said opening is uncovered; and
   control means for selectively moving said closure means between said first and second positions.

2. Directional control apparatus as defined in claim 1 wherein:
   said closure means comprises a plurality of longitudinally extending louvers spaced across said opening and pivotally connected at the ends thereof to said housing; and
   said control means comprises a fluid-actuated cylinder mounted on said housing, the drive shaft of said cylinder being connected to said louvers, whereby said cylinder can be operated to rotate said louvers simultaneously between a first position wherein they are substantially flush with the wall of said housing and a second position wherein they are disposed substantially perpendicular to said wall.

3. Directional control apparatus as defined in claim 1 including flow control means mounted on the aft end of said housing and extending circumferentially thereof, said means being adapted for movement toward and away from the longitudinal axis of said housing whereby the space between said housing and thrust nozzle can be controllably evacuated by flow of exhaust gases from the latter.

4. Directional control apparatus as defined in claim 3 wherein said flow control means comprises a plurality of vanes pivotally mounted on the aft end of said housing and disposed circumferentially thereof.

References Cited

UNITED STATES PATENTS

| 2,762,584 | 9/1956 | Price | 239—265.39 |
| 2,778,190 | 1/1957 | Bush | 239—265.39 |
| 2,798,360 | 7/1957 | Hazen et al. | 239—265.39 |
| 3,344,882 | 10/1967 | Bellion et al. | 239—265.39 |

EVERETT W. KIRBY, *Primary Examiner.*

U.S. Cl. X.R.

239—265.33, 265.39